(12) United States Patent
Moore

(10) Patent No.: US 10,992,794 B2
(45) Date of Patent: Apr. 27, 2021

(54) MOBILE-CORDLESS PHONE SYSTEMS

(71) Applicant: Margarita Moore, Cincinnati, OH (US)

(72) Inventor: Margarita Moore, Cincinnati, OH (US)

( * ) Notice: Subject to any disclaimer, the term of this patent is extended or adjusted under 35 U.S.C. 154(b) by 0 days.

(21) Appl. No.: 15/932,304

(22) PCT Filed: Aug. 17, 2016

(86) PCT No.: PCT/US2016/047422
§ 371 (c)(1),
(2) Date: Feb. 16, 2018

(87) PCT Pub. No.: WO2017/031244
PCT Pub. Date: Feb. 23, 2017

(65) Prior Publication Data
US 2018/0213076 A1  Jul. 26, 2018

Related U.S. Application Data

(60) Provisional application No. 62/283,020, filed on Aug. 18, 2015.

(51) Int. Cl.
*H04M 1/00* (2006.01)
*H04M 1/724* (2021.01)
(Continued)

(52) U.S. Cl.
CPC .............. *H04M 1/724* (2021.01); *H02J 7/35* (2013.01); *H04M 1/0279* (2013.01);
(Continued)

(58) Field of Classification Search
CPC ... H04W 88/06; H04W 48/18; H04M 1/0279; H04M 1/72519; H04M 1/738;
(Continued)

(56) References Cited

U.S. PATENT DOCUMENTS 8,306,197 B1 * 11/2012 Turner .............. H04M 1/72527
379/93.05
2012/0214556 A1 * 8/2012 Niemela .............. H04B 1/3883
455/572

(Continued)

*Primary Examiner* — Pakee Fang
(74) *Attorney, Agent, or Firm* — The Iwashko Law Firm, PLLC; Lev Ivan Gabriel Iwashko

(57) ABSTRACT

A mobile-cordless phone system including a mobile-cordless phone assembly; the mobile-cordless phone assembly including an external-phone-body and an internal-circuitry system. The external-phone-body and the internal-circuitry system are structured and arranged to provide the user with a device useful for communications with the internal-circuitry useful for providing a user with a portable telephone with the capabilities to operate on a wireless cellular network and, optionally, a telephone landline. The mobile-cordless phone assembly may be weather-resistant in some embodiments, and may include a multi-color-LED-light-source useful for providing visual indications and notifications to the user. The mobile-cordless phone system includes a solar panel for charging. The mobile-cordless phone assembly may also include a charging-port for connecting a charging-device to the mobile-cordless phone system. Preferred embodiments may also include a fingerprint-reader.

9 Claims, 5 Drawing Sheets

(51) Int. Cl.
  *H04M 1/72502* (2021.01)
  *H02J 7/35* (2006.01)
  *H04M 1/02* (2006.01)
  *H04M 1/738* (2006.01)
  *H02S 99/00* (2014.01)
(52) U.S. Cl.
  CPC ....... *H04M 1/72502* (2013.01); *H04M 1/738* (2013.01); *H02S 99/00* (2013.01); *H04M 2250/06* (2013.01); *H04M 2250/22* (2013.01); *Y02A 30/00* (2018.01)
(58) Field of Classification Search
  CPC ........... H04M 2250/06; H04M 2250/22; H02J 7/355; H02S 99/00
  See application file for complete search history.

(56) References Cited

U.S. PATENT DOCUMENTS

| | | | |
|---|---|---|---|
| 2014/0055014 A1* | 2/2014 | Pan | H05K 5/02 |
| | | | 312/223.2 |
| 2014/0162729 A1* | 6/2014 | Garden | H04B 1/3888 |
| | | | 455/566 |
| 2016/0127525 A1* | 5/2016 | Lee | H04M 1/0279 |
| | | | 455/575.1 |

\* cited by examiner

MOBILE-CORDLESS PHONE SYSTEMS

CROSS-REFERENCE TO RELATED APPLICATION

The present application is related to and claims priority from prior provisional application Ser. No. 62/283,020, filed Aug. 18, 2015, and from prior nonprovisional application Ser. No. 15/067,891, filed Mar. 11, 2016, which applications are incorporated herein by reference for all purposes.

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of telecommunications devices and more specifically relates to mobile-cordless phone systems.

2. Description of Related Art

Individuals often depend on mobile phones for searching the internet, sending and receiving emails, and texting in addition to speaking to other individuals. Often times, individuals cannot make the necessary phone call or other communication due to a low or dead battery. Some alternately powered devices are available in the art, but most are cumbersome and non-aesthetically pleasing. Further, while traveling, individuals must remember to carry a charger for the phone to replenish the power supply.

Also, most phones are similar in appearance, lacking creative shapes and/or styling. Some phones may be available in different sizes or shapes, but the majority has similar utilitarian designs. Additionally, most mobile phones are quite fragile, and easily damaged is dropped or scratched. Therefore a creative solution is desired.

Several attempts have been made to solve the above-mentioned problems such as those found in U.S. Pat. and Pub. Nos. 2005/0085262 to Underwood, U.S. Pat. No. 9,048,927 to Glynn, 2014/0066137 to Sorondo, U.S. Pat. No. 7,054,642 to Matz et al., 2005/0266887 to Elmenayer, U.S. Pat. No. 9,167,106 to Woodley et al., U.S. Pat. No. 5,127,042 to Gillig et al., 2013/0040707 to Metcalf, U.S. Pat. No. 6,167,278 to Nilssen, and U.S. Pat. No. 7,327,981 to Hundal. This art is representative of telecommunications devices. However, none of the above inventions and patents, taken either singly or in combination, is seen to describe the invention as claimed.

Preferably, a mobile-cordless phone system should provide a device to allow a user to communicate by a variety of selected networks, with the capability to be selectively recharged by solar power or standard charger and, yet would operate reliably and be manufactured at a modest expense. Thus, a need exists for a reliable mobile-cordless phone system to avoid the above-mentioned problems.

BRIEF SUMMARY OF THE INVENTION

In view of the foregoing disadvantages inherent in the known telecommunications device art, the present invention provides a novel mobile-cordless phone system. The general purpose of the present invention, which will be described subsequently in greater detail is to provide a portable communication device useful for allowing a user to operate the device over a wide variety of different networks while providing the user with the capability to charge the device by solar energy, if so desired.

A mobile-cordless phone system is disclosed herein, in a preferred embodiment, comprising a mobile-cordless phone assembly; the mobile-cordless phone assembly comprising an external-phone-body and an internal-circuitry system. The external-phone-body and the internal-circuitry system are structured and arranged to provide the user with a device useful for communications with the internal-circuitry useful for providing the user with a portable telephone with the capabilities to operate the telephone on a wireless cellular network and, optionally, a telephone landline. Included in the capabilities to operate on a wireless cellular network includes the ability to download mobile applications (e.g., games, news, data, social media, videos, photographs, etc.)

The mobile-cordless phone assembly may be weather-resistant in some embodiments and may additionally include a multi-color-LED-light-source useful for providing visual indications and notifications to the user (e.g., incoming call, voicemail, email, weather alerts, news announcements, etc.). Embodiments of the mobile-cordless phone assembly may further include a charging-port useful for affixing a charging-device to the mobile-cordless phone system. Preferred embodiments may also include a fingerprint-reader, preferably integrated into the touch-screen.

In preferred embodiments, the internal-circuitry system may include a mobile personal area network communication capabilities (e.g., BLUETOOTH, etc.), Wi-Fi communication capabilities, and further include a GPS-receiver.

The external-phone-body comprises an outside-body, an inside-body, a top-side, a bottom-side, a right-side, and a left-side in structural and functional combination, in preferred embodiments. The mobile-cordless phone system may include embodiments where the outside-body-surface, the inside-body-surface, the top-body-surface, the bottom-body-surface, the right-side-body and the left-side-body are constructed of a self-healing material to reduce visible scratches and may additionally be constructed of a semi-flexible material to provide durability, longevity, and impact resistance to the mobile-cordless phone system to visible prevent wear and tear, and damage from dropping the mobile-cordless phone system.

Preferred embodiments include the outside-body comprised of an outside-body-surface, a solar-panel, a phone-jack, and a phone-jack-cover in functional combination; where the solar-panel is useful for charging the mobile-cordless phone system (by using solar energy or other forms of light such as ultra-violet light), and the phone-jack is useful for allowing the user with the capability to connect the mobile-cordless phone system to a telephone-landline. The phone-jack-cover is useful for protecting the phone-jack from damage, external elements and moisture. Embodiments of the outside-body may further include a digital-camera and photographic-flash.

Preferred embodiments of the inside-body may comprise an inside-surface and a touch-screen in functional combination where the touch-screen is useful for allowing the user to operate the mobile-cordless phone system and may additionally include a digital-camera and photographic flash.

The top-side comprises a top-body-surface and a speaker in functional combination, in preferred embodiments. The speaker is useful for allowing the user to receive verbal output from the mobile-cordless phone system. The bottom-side comprises a bottom-body-surface and a microphone in functional combination where the microphone is useful for allowing the user to provide verbal input into the mobile-cordless phone system. Preferred embodiments of the mobile-cordless phone system may include a bottom-side, which further includes a loudspeaker useful for allowing the user to communicate via the mobile-cordless phone system in a speaker-phone mode.

The right-side comprises a right-side-body and at least one function-button in functional combination where the least one-function button is useful for allowing the user to operate the mobile-cordless phone system. The left-side comprises a left-side-body and may further include at least one function-button in preferred embodiments.

The present invention holds significant improvements and serves as a mobile-cordless phone system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention, which are believed to be novel, are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures, which accompany the written portion of this specification, illustrate embodiments and method(s) of use for the present invention, mobile-cordless phone system, constructed and operative according to the teachings of the present invention.

The various embodiments of the present invention will hereinafter be described in conjunction with the appended drawings, wherein like designations denote like elements.

DETAILED DESCRIPTION

Figure 1:
FIG. 1 shows a perspective view illustrating a mobile-cordless phone system during an 'in-use' condition showing a user using the mobile-cordless phone system to communicate by a selected network according to an embodiment of the present invention.

As discussed above, embodiments of the present invention relate to a telecommunications device and more particularly to a mobile-cordless phone system as used to improve the portable communication devices by allowing a user to operate a device on a wide variety of different networks while providing the user the capability to charge the device by solar energy or other light (such as ultra-violet light) if so desired.

Generally speaking, a mobile-cordless phone system comprises a mobile-cordless phone assembly; the mobile-cordless phone assembly comprising external-phone-body and internal-circuitry with external-phone-body and internal-circuitry system structured and arranged to provide user with a device useful for communications. Those with ordinary skill in the art will now appreciate that upon reading this specification and by their understanding the art of telecommunications devices as described herein, methods of constructing, programming and using modern telecommunications devices will be understood by those knowledgeable in such art. The structure and arrangement of features of a mobile-cordless phone system may vary dependent upon the specific application and desired characteristics thereto. Profiles may alter as per useful application.

Referring to the drawings by numerals of reference there is shown in FIGS. 1-4 mobile-cordless phone system 100 comprises mobile-cordless phone assembly 102. Mobile-cordless phone assembly 102 may comprise external-phone-body 104 and internal-circuitry 116. External-phone body 104 may comprise outside-body 106, inside-body 120, top-side 130, bottom-side 160, right-side 170, and left-side 180.

Figure 2A:
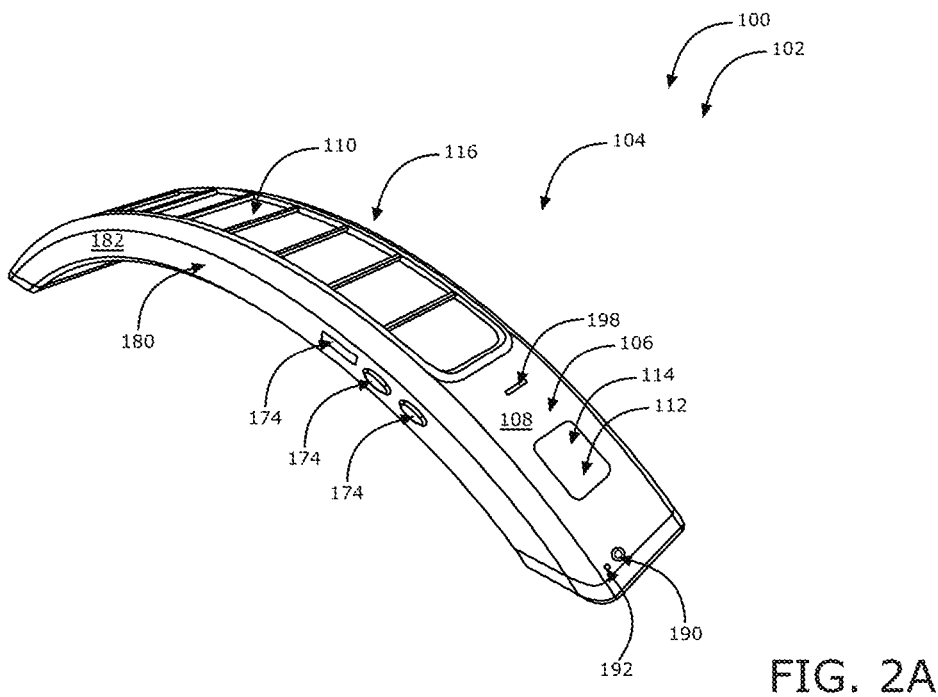
FIG. 2A is a right-rear perspective view illustrating an embodiment of a mobile-cordless phone system comprising an external-phone-body and an internal-circuitry system according to an embodiment of the present invention of FIG. 1.
Figure 2B:
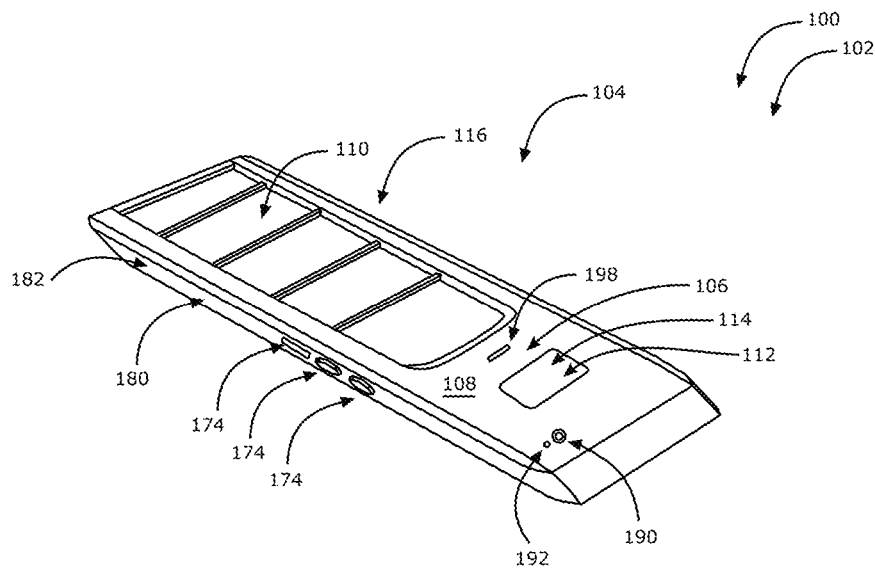
FIG. 2B is a right-rear perspective view illustrating an alternate embodiment of a mobile-cordless phone system comprising an external-phone-body and an internal-circuitry system according to an embodiment of the present invention of FIG. 1.

Referring more specifically now to FIGS. 2A and 2B, outside-body 106 may comprise outside-body-surface 108, solar-panel 110, phone-jack 112, and phone-jack-cover 114, with solar-panel 110 useful for charging of mobile-cordless phone system 100 by using any adequate light source (e.g., solar, infrared, ultra-violet for charging during night-time, etc.). In one embodiment, the solar-panel 110 is preferably selected from commercially-available amorphous silicon (non-crystalline) photovoltaic materials that produce electrical energy when exposed to artificial light or sunlight. Embodiments of external-phone body 104 may include charging-port 194 useful for affixing charging-device 196 to mobile-cordless phone system 100 to charge mobile-cordless phone system 100. Some embodiments of outside-body 106 may further comprise digital-camera 190 and photographic-flash 192. Phone-jack 112 is useful for providing user 140 with the capability to connect mobile-cordless phone system 100 to a telephone-landline, where phone-jack-cover 114 is useful for protecting phone-jack 112 from damage and debris. As shown, outside-body 106 may comprise a flat/rectangular appearance, in some embodiments. Additional embodiments may include outside-body 106, which includes an arcuate shape (depending upon user preferences and specific conditions). Similarly, inside-body 120 may include embodiments that comprise a flat/rectangular shape; other embodiments of inside-body 120 may include an arcuate shape.

Figure 3A:
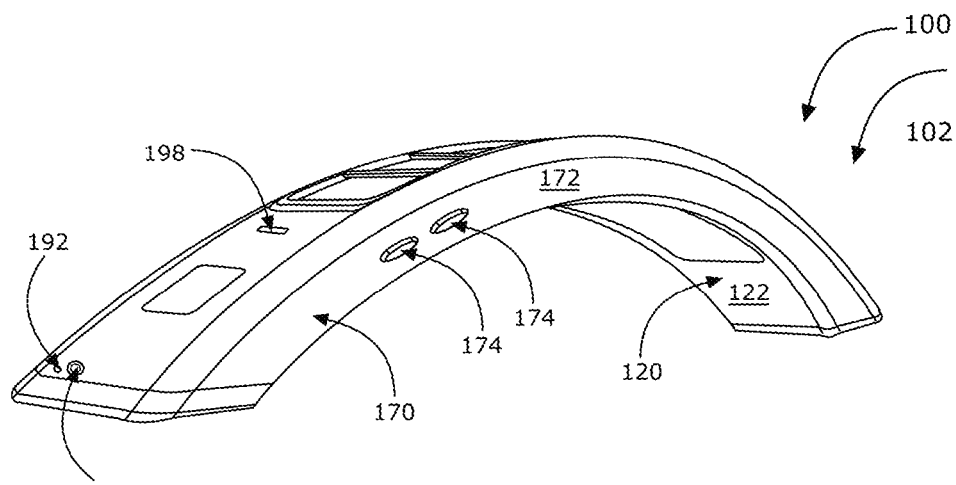
FIG. 3A is a left-rear perspective view illustrating an embodiment of the mobile-cordless phone assembly according to an embodiment of the present invention of FIGS. 1-2.
Figure 3B:
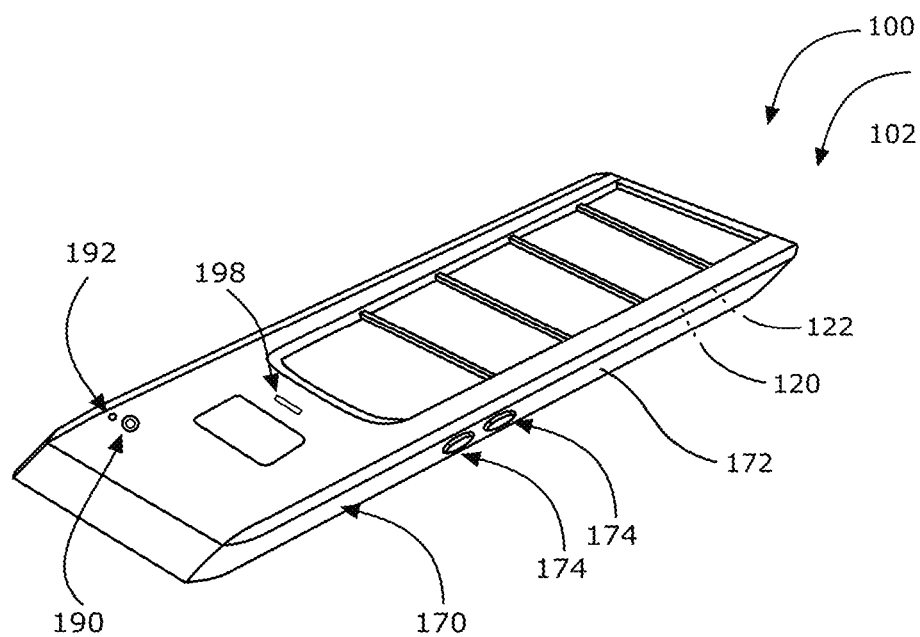
FIG. 3B is a left-rear perspective view illustrating an alternate embodiment of the mobile-cordless phone assembly according to an embodiment of the present invention of FIGS. 1-2B.
Figure 4:
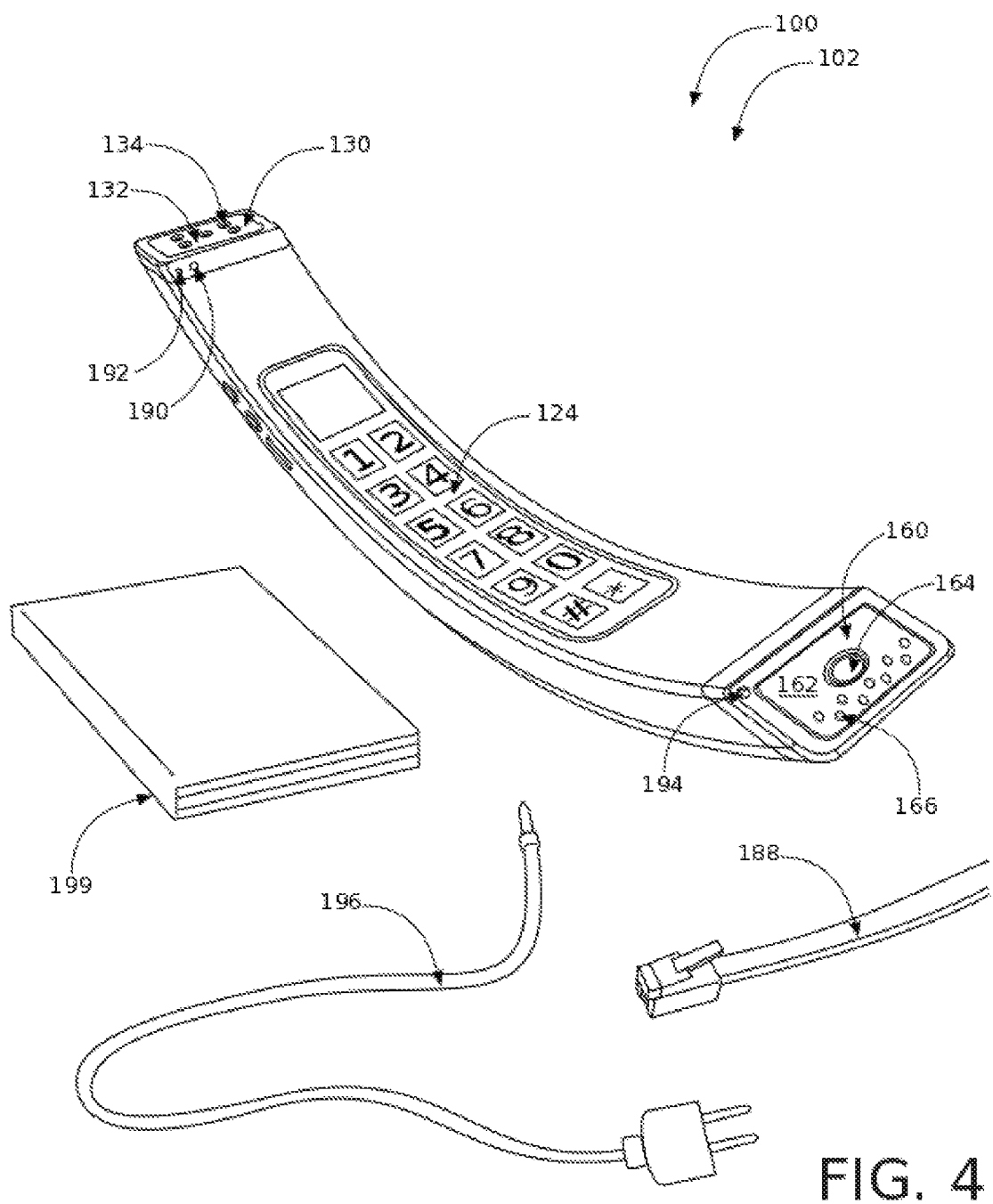
FIG. 4 is a left-front perspective view illustrating a mobile-cordless phone assembly according to an embodiment of the present invention of FIGS. 1-3B.

Referring now to FIGS. 3A, 3B and 4, right-side 170 may comprise right-side-body 172 and at least one function-button 174, function-button 174 useful for allowing user to operate mobile-cordless phone system 100. Additional embodiments of left-side 180 may also include at least one function-button 174. Inside-body 120 may comprise inside-surface 122 and touch-screen 124 in functional combination, with some embodiments further comprising digital-camera 190 and photographic-flash 192. Touch-screen 124 is useful for allowing user to operate and control the functionality of mobile-cordless phone system 100. Top-side 130 may comprise top-body-surface 132 and speaker 134 in functional combination, where bottom-side 160 may comprise bottom-body-surface 162 and microphone 164 in functional combination.

Speaker 134 is useful for allowing user 140 to receive verbal output from mobile-cordless phone system 100; where microphone 164 is useful for allowing user 140 to provide verbal input into mobile-cordless phone system 100. Embodiments of bottom-side 160 may further include loudspeaker 166 useful for allowing user 140 to communicate via mobile-cordless phone system 100 in a speaker-phone mode.

Internal-circuitry 116 is useful for providing user 140 with a mobile and portable telephone with the capabilities to operate the mobile and portable telephone on either a wireless cellular network or a telephone landline, or both. Included in the capabilities to operate on a wireless cellular network includes the ability to download mobile applications. Embodiments of internal-circuitry 116 may include mobile personal area network communication capabilities, Wi-Fi communication capabilities, and include a GPS receiver.

Embodiments of mobile-cordless phone assembly 102 may be weather-resistant (via known means in the art to provide sealing means) and embodiments may include outside-body-surface 108, inside-body-surface 122, top-body-surface 132, bottom-body-surface 162, right-side-body 172 and left-side-body 182 constructed of a semi-flexible material to provide durability, longevity, and increased impact resistance to mobile-cordless phone system 100 and mobile-cordless phone assembly 102. Additionally, outside-body-surface 108, inside-body-surface 122, top-body-surface 132, bottom-body-surface 162, right-side-body 172 and left-side-body 182 may be constructed of a self-healing material to reduce visible scratches and wear and tear, in some embodiments. Additional embodiments of mobile-cordless phone assembly 102 may additionally include a fingerprint-reader, preferably integrated into touch-screen 124 and may further include multi-color-LED-light-source 198 useful for providing visual indications to user.

Referring now to FIG. 4, showing mobile-cordless phone system 100. mobile-cordless phone system 100 may be sold as kit 440 comprising the following parts: at least one mobile-cordless phone assembly 102 at least one charging-device 196; at least one length of telephone cable 188; and at least one set of user instructions. The kit has instructions such that functional relationships are detailed in relation to the structure of the invention (such that the invention can be used, maintained, or the like in a preferred manner). Mobile-cordless phone system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different sealing combinations, parts may be sold separately, etc., may be sufficient.

Figure 5:
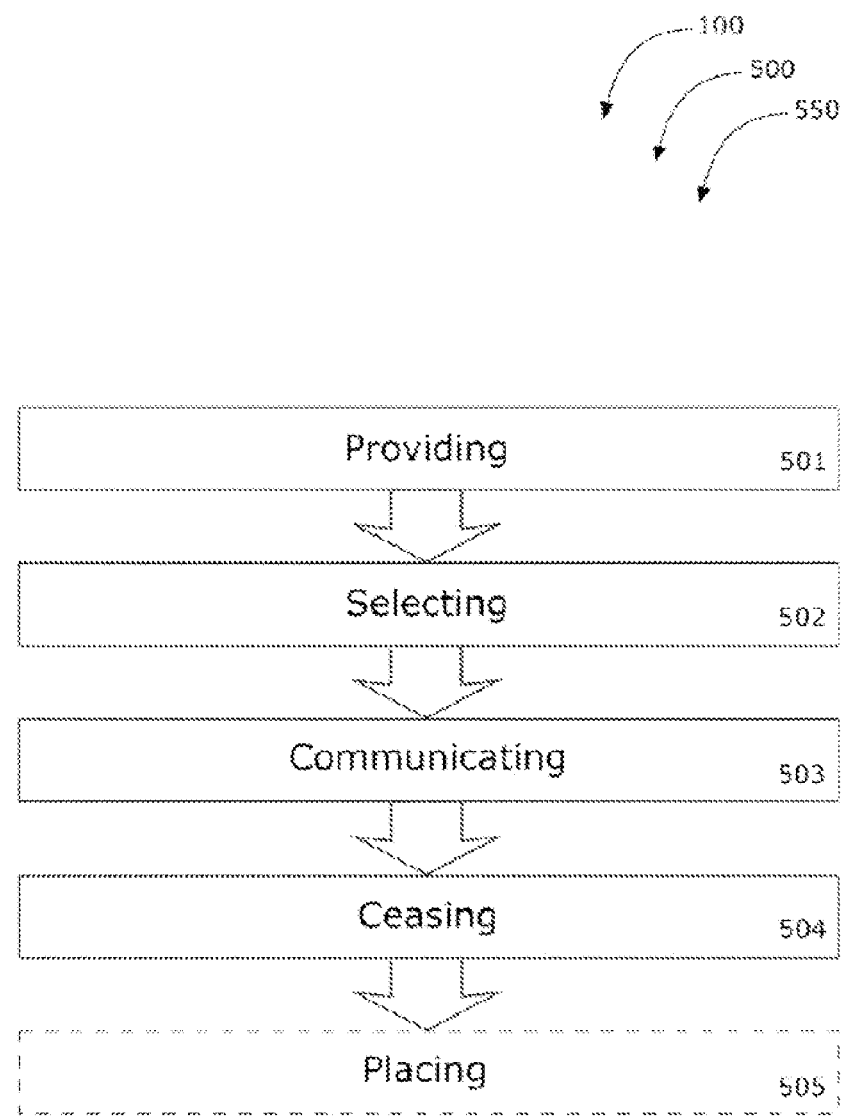
FIG. 5 is a method of use for the mobile-cordless phone system according to an embodiment of the present invention of FIGS. 1-4.

Referring now to FIG. 5 showing flowchart 550 illustrating method of use 500 for mobile-cordless phone system 100 according to an embodiment of the present invention of FIGS. 1-4. As shown, method of use 500 may comprise the steps of: step one 501, providing mobile-cordless phone assembly 102; step two 502, selecting a data transfer network from the group consisting of a wireless data network, a mobile personal area network, a Wi-Fi network, and a dedicated landline date network; step three 503, communicating with at least one individual on the selected network; step four 504, ceasing communications with at least one individual; step six 506, placing mobile-cordless phone assembly 102 into a lighted area to charge.

It should be noted that step five 505 is an optional step and may not be implemented in all cases. Optional steps of method of use 500 are illustrated using dotted lines in FIG. 5 so as to distinguish them from the other steps of method of use 500.

It should be noted that the steps described in the method of use can be carried out in many different orders according to user preference. The use of "step of" should not be interpreted as "step for", in the claims herein and is not intended to invoke the provisions of 35 U.S.C. § 112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A mobile-cordless phone system, comprising:
   an external phone body having an arcuate shape such that the arcuate shape extends longitudinally along an entire portion of the external phone body, such that the external phone body comprises an outside-arcuate-body, an inside-arcuate-body, a top-side, a bottom-side, a right-side, and a left-side in structural combination;
   a power supply disposed within the external phone body;
   a solar panel disposed at a center portion along a rear surface of the external phone body to use energy from light to charge the power supply, such that the solar panel is arranged along the rear surface of the external phone body to correspond to the arcuate shape of the external phone body; and
   a phone jack disposed on the rear surface of the external body to connect the mobile-cordless phone system to a landline, wherein said mobile-cordless phone system further includes a multi-color-LED-light-source useful for providing visual indications to said user, wherein the outside-arcuate-body, the inside-arcuate-body, the top-side, the bottom-side, the right-side and the left-side are constructed of a self-healing material to reduce visible scratches, wherein said outside-arcuate-body, the inside-arcuate-body, the top-side, the bottom-side, the right-side and the left-side are constructed of a semi-flexible material to provide durability, longevity, and impact resistance to said mobile-cordless phone system, wherein said mobile-cordless phone assembly is weather-resistant.

2. The mobile-cordless phone system of claim 1, further comprising:

a phone jack cover to selectively cover the phone jack to protect the phone jack from at least one of external elements and moisture.

3. The mobile-cordless phone system of claim 1, wherein the external phone body has an arcuate shape.

4. The mobile-cordless phone system of claim 1, wherein the external phone body is comprised of a flexible material to bend from a straight shape to an arcuate shape.

5. The mobile-cordless phone system of claim 1, wherein the external phone body comprises:

a digital camera to capture at least one of still photographs and moving photographs.

6. The mobile-cordless phone system of claim 1, wherein the external phone body comprises:

a touch screen disposed on the surface of the external phone body to allow a user to operate the mobile-cordless phone system.

7. The mobile-cordless phone system of claim 6, wherein the touch screen is disposed on a front surface of the external phone body.

8. The mobile-cordless phone system of claim 6, wherein the touch screen comprises a fingerprint reader to read a fingerprint of the user.

9. The mobile-cordless phone system of claim 1, further comprising:

a charging port disposed on the surface of the external phone body to allow the mobile-cordless phone system to be charged.

* * * * *